March 19, 1935. R. RUTLEDGE 1,995,191

APPARATUS FOR PURIFYING AIR IN CLOSED CHAMBERS

Filed Dec. 10, 1932

Inventor
R. Rutledge
By J. Edw. Maybee
ATTY

Patented Mar. 19, 1935

1,995,191

UNITED STATES PATENT OFFICE 1,995,191

APPARATUS FOR PURIFYING AIR IN CLOSED CHAMBERS

Robert Rutledge, Toronto, Ontario, Canada

Application December 10, 1932, Serial No. 646,581

5 Claims. (Cl. 62—89)

It is a matter of common knowledge that, when food is kept in closed refrigerating chambers in which the temperature is above the freezing point, foul gases are generated which pollute the air and spoil the taste and smell of the food.

While this trouble is found in practically all refrigerators, it is particularly noticeable in refrigerators employing mechanical refrigeration in which the refrigerating unit is usually a coil positioned adjacent the top of the chamber, and my object is to device a simple and efficient method of purifying the air in the chamber and preventing the contamination of the food.

The invention is based on the discovery that still fresh water will absorb the air contaminating gases, so that by bringing the foul air in a chamber into contact with the surface of a body of such water the air will be kept pure provided the water be renewed as rapidly as may be necessary to maintain its power to absorb foul gases or other odoriferous matter.

Briefly the invention may be described as follows. A shallow pan is located in the chamber. Into this pan fresh water is caused to flow quietly at a rate sufficient to maintain its absorptive powers. The pan is provided with an overflow which maintains a constant water level in the pan.

In a refrigerator this pan will be located at the top of the chamber above the refrigerating unit, though it may also be desirable to locate a similar pan below the refrigerating unit and to drain the upper pan thereto. Thermo-siphonic action is depended upon to circulate air over the upper pan, down over the refrigerating unit and over the lower pan when one is used. Suitable flues and guiding means are provided to aid this circulation.

Usually the rate of change of water will be such as to change the contents of the upper tank once every twenty-four hours and the change may be either stepwise or continuous provided the absorptive power of the water is properly maintained.

The temperature of the water will generally be about that of the air in the chamber which helps absorption and also facilitates the air circulation.

The water does not, therefore, in any way act as a cooling medium, but only as a deodorant.

Figure 1:
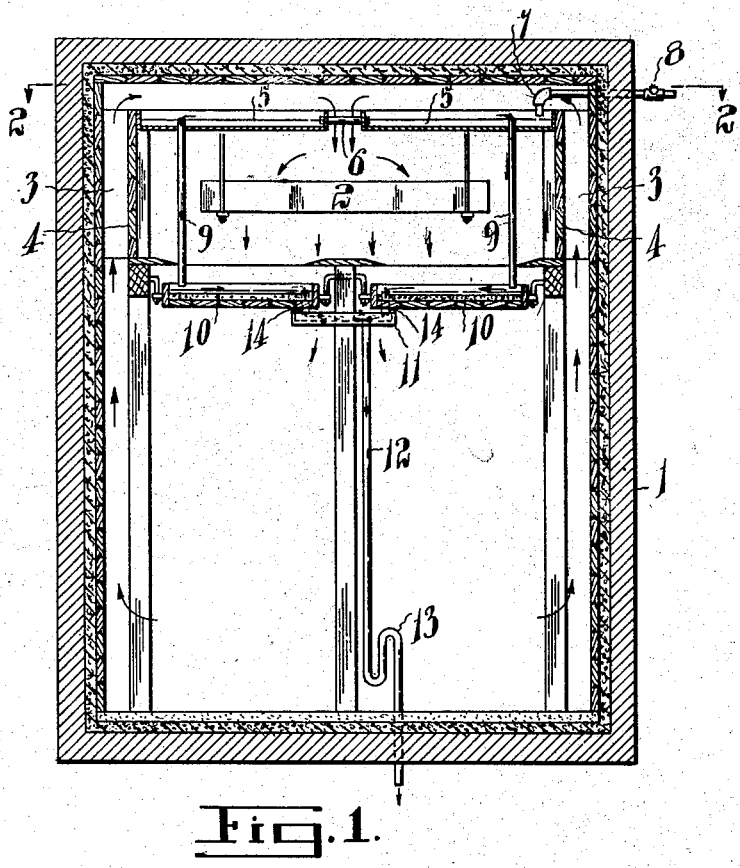
Figure 2:
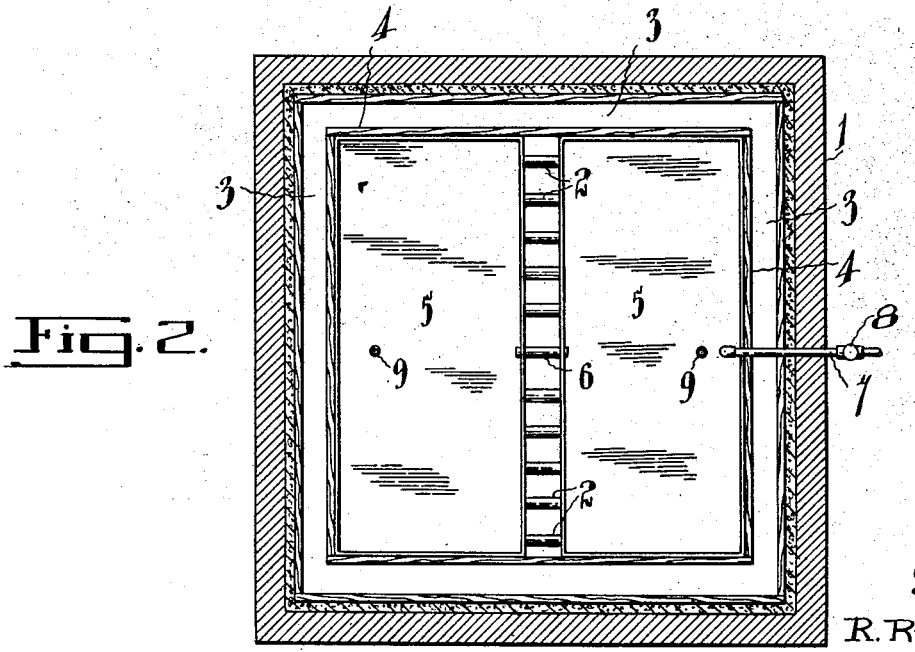

The invention is hereinafter more specifically described and apparatus utilizing its principles is illustrated in the accompanying drawing in which Fig. 1 is a vertical section of the apparatus; and Fig. 2 a section on the line 2—2 in Fig. 1.

In the drawing like numerals of reference indicate corresponding parts in the different figures.

Referring to the drawing, 1 is a refrigerating chamber of ordinary construction such as commonly employed by merchants. Within this chamber at its upper end is suspended the refrigerating unit 2, which is usually a coil of some kind through which a cooling medium is circulated.

Surrounding the refrigerating unit is a wall core spaced from the interior of the chamber at all sides, thus forming a vertical flue 3. Air cooled by the refrigerating unit thus drops to the bottom of the chamber 1 displacing the warmer air therein which flows up through the flue 3 to the top of the chamber.

Suitably supported at or about the level of the top of the wall 4 is a refrigerating pan or pans 5. Two pans 5 are shown connected by the pipe 6. Into one of the pans discharges the water supply pipe 7 which extends from the outside through the wall of the chamber. This pipe is provided with the controlling valve 8 by means of which the rate of supply of fresh water to the pans may be accurately regulated. These pans have a surface area as large as possible, while their depth is comparatively small since it is not necessary to hold a large body of water provided the supply of fresh water is adequately maintained.

The opposite long sides of the pans fit close to two opposite sides of the flue wall, while the other sides of the flue wall fit close to the short ends of the pan.

Each pan 5 is provided with an overflow pipe 9, the upper end of which extends sufficiently far above the bottom of the pan to enable the necessary depth of water to be maintained in the pan. These overflow pipes discharge to two pans 10 below the refrigerating unit and each of these pans in turn discharges to the collecting pan 11 from which leads the discharge pipe 12 provided with the usual trap 13.

The overflow pipes 14 of the pans 10 are arranged in a similar manner to the overflow pipe 9 so that a given depth of water may be maintained in each of these pans 10.

The result of the construction described is that air is cooled by the refrigerating unit and drops to the bottom of the refrigerating chamber displacing the warm air which passes up the flue 3 over the tops of the pans 5 and down between these pans at the centre to the refrigerating unit from which the air, now cooled by contact with the refrigerating unit, passes over the surfaces of the water in the pans 10 and 11 and thence to the bottom of the chamber. The air is thus constantly in circulation over the surface of still water which absorbs the objectionable odors and atmospheric impurities as hereinbefore referred to.

The features of importance in my invention to obtain the best results are: that substantially pure water is employed, that is the water contains no other soluble impurities than are contained in good drinking water: that the water be "still", that is not in a disturbed or finely divided state; that the air in the chamber be caused to flow over its surface; that its temperature be above that of the air at the bottom of the chamber as this favors circulation of air and the absorption of odoriferous matter therefrom; and that the water be located close to the top of the chamber, as it is desirable and easier to remove the impurities before the air is chilled by the refrigerating unit.

The advantages of this invention are: first objectionable odors are removed from the air in the refrigerator and from the food; secondly that, by the removal of impurities from the air surrounding it, the food keeps better; thirdly, the pure air acquires the natural degree of humidity to keep the food in good condition; and lastly that the purified and conditioned air is more easily cooled which reduces the running time of the refrigerating unit and thus reduces the tendency to dehydration which causes loss of weight and deterioration of the quality of the food.

What I claim as my invention is:

1. Refrigerating apparatus comprising a closed chamber; a refrigerating unit positioned in the chamber adjacent the top thereof; a pan positioned in the chamber above the refrigerating unit adapted to contain a shallow body of water of extended surface; means for supplying fresh water to said pan and withdrawing surplus; and means for guiding rising air over the pan and for directing it down to the refrigerating unit and towards the bottom of the chamber.

2. Refrigerating apparatus comprising a closed chamber; a refrigerating unit positioned in the chamber above the bottom thereof; a pan positioned in the chamber above the refrigerating unit adapted to contain a shallow body of still water of extended surface; a similar pan below the refrigerating unit; means for supplying fresh water to said upper pan and withdrawing surplus to the lower pan; means for withdrawing surplus water from the lower pan; and means for guiding rising air over the upper pan and for directing it down to the refrigerating unit and thence over the lower pan to pass to the bottom of the chamber.

3. Refrigerating apparatus comprising a closed chamber having a food space adjacent the bottom; a refrigerating unit positioned in the chamber adjacent the top thereof; a pan positioned in the chamber above the refrigerating unit adapted to contain a shallow body of water of extended surface; a flue at one side of the refrigerator adapted to lead air from the food space to the top of the chamber close to one side of the pan, the opposite edge of the pan being located above the middle of the unit, so that air rising from the food space up the flue passes over the surface of the pan, thence down to the refrigerating unit and thence to the food space again.

4. Refrigerating apparatus comprising a closed chamber having a food space adjacent the bottom; a refrigerating unit centrally positioned in the chamber adjacent the top thereof; two pans spaced from one another laterally to form an air passage between them, each pan being adapted to contain a shallow body of water of extended surface; a flue at each side of the refrigerator adapted to lead air from the food space to the top of the chamber close to the outer sides of the pans, so that air rising from the food space at opposite sides of the chamber passes over the pans thence through the space between the pans to and through the refrigerating unit and thence to the food space again.

5. Refrigerating apparatus as set forth in claim 4 provided also with flues at the remaining sides of the chamber leading air from the food space to the ends of the pans.

ROBERT RUTLEDGE.